(12) United States Patent
Chen et al.

(10) Patent No.: US 11,381,370 B2
(45) Date of Patent: Jul. 5, 2022

(54) RETRANSMISSION ACTIVATING/DEACTIVATING METHOD, BASE STATION, USER EQUIPMENT AND DEVICE

(71) Applicant: CHINA ACADEMY OF TELECOMMUNICATIONS TECHNOLOGY, Beijing (CN)

(72) Inventors: Li Chen, Beijing (CN); Fangli Xu, Beijing (CN); Pierre Bertrand, Beijing (CN); Jiamin Liu, Beijing (CN); Xinyu Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 104 days.

(21) Appl. No.: 16/639,879

(22) PCT Filed: Aug. 3, 2018

(86) PCT No.: PCT/CN2018/098518
§ 371 (c)(1),
(2) Date: Feb. 18, 2020

(87) PCT Pub. No.: WO2019/037586
PCT Pub. Date: Feb. 28, 2019

(65) Prior Publication Data
US 2020/0266962 A1    Aug. 20, 2020

(30) Foreign Application Priority Data
Aug. 24, 2017    (CN) .......................... 201710737578.9

(51) Int. Cl.
*H04W 72/04* (2009.01)
*H04L 5/00* (2006.01)

(52) U.S. Cl.
CPC ......... *H04L 5/0098* (2013.01); *H04W 72/042* (2013.01)

(58) Field of Classification Search
CPC ........ H04W 72/042; H04W 72/04; H04L 5/00
See application file for complete search history.

(56) References Cited

U.S. PATENT DOCUMENTS

2009/0138775 A1* 5/2009 Christiaens ............... G06F 1/12
714/748
2009/0257408 A1* 10/2009 Zhang ................... H04L 1/1635
370/336

(Continued)

FOREIGN PATENT DOCUMENTS

CN    10630441 A    1/2017

OTHER PUBLICATIONS

Extended European Search Report, PCT/CN2018098518, dated Jun. 25, 2020, China Academy of Telecommunications Technology.

(Continued)

*Primary Examiner* — Chi Ho A Lee
(74) *Attorney, Agent, or Firm* — Harness, Dickey & Pierce, P.L.C.

(57) ABSTRACT

The present disclosure provides a retransmission activating/deactivating method, a base station, a user equipment and a device. The method includes: determining a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission; and, when determining to activate/deactivate retransmission of the bearer which is allowed for retransmission under the first base station, populating, by the first base station, the bit, which is in the preset field of the (Continued)

MAC CE for activating/deactivating retransmission and corresponding to the bearer, thereby generating the MAC CE for activating/deactivating retransmission, and transmitting to the UE the generated MAC CE for activating/deactivating retransmission.

10 Claims, 6 Drawing Sheets

(56) References Cited

U.S. PATENT DOCUMENTS

| | | | | |
|---|---|---|---|---|
| 2010/0278105 | A1* | 11/2010 | Diachina | H04W 28/10 370/328 |
| 2010/0322165 | A1* | 12/2010 | Yoo | H04L 1/0073 370/329 |
| 2013/0010611 | A1* | 1/2013 | Wiemann | H04L 1/08 370/242 |
| 2013/0089058 | A1* | 4/2013 | Yang | H04L 1/1835 370/329 |
| 2014/0072035 | A1* | 3/2014 | Rabii | H04N 5/147 375/240.03 |
| 2014/0204832 | A1* | 7/2014 | Van Phan | H04W 16/26 370/315 |
| 2017/0196022 | A1 | 7/2017 | Yi et al. | |
| 2018/0249388 | A1* | 8/2018 | Baek | H04W 36/305 |
| 2019/0245657 | A1* | 8/2019 | Lee | H04L 1/1812 |
| 2019/0320467 | A1* | 10/2019 | Freda | H04L 5/0055 |

OTHER PUBLICATIONS

3GPP TSG RAN WG2 #99, R2-1707712, Aug. 21-25, 2017, Berlin, Germany, Agenda Item: 10.3.1.11, Source: Huawei, HiSilicon, Title: Design of MAC CE for duplicate activation/deactivation, Document for: Discussion and Decision.

3GPP TSG-RAN WG2 #99, R2-1707921, Aug. 21-25, 2017, Berlin, Germany, Agenda Item: 10.3.1.11, Source: CATT, Title: Duplicate Activation/Deactivation MAC CE, Document for: Discussion and Decision.

Patent Cooperation Treaty, Notification of Transmittal of Translation of the International Preliminary Report on Patentability, PCT/CN2018/098518, dated Mar. 5, 2020, China Academy of Telecommunications Technology.

* cited by examiner

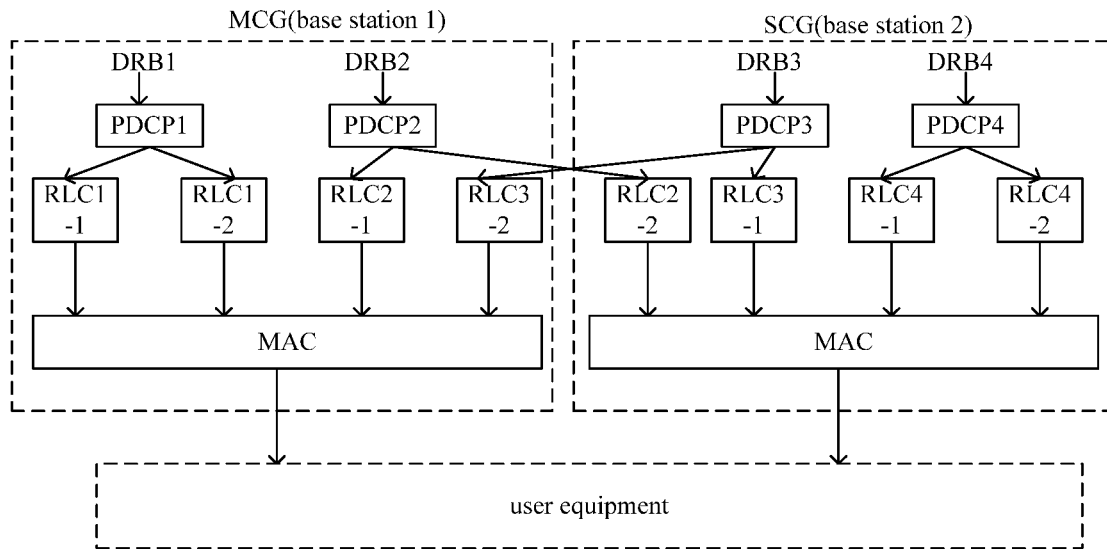

FIG. 3 determining a correspondence relationship between a bearer which is allowed for retransmission under the first base station and a bit of a preset field of media access control (MAC) control element (CE) of the first base station for activating/deactivating retransmission — 41 when determining to activate/deactivate retransmission of the bearer which is allowed for retransmission under the first base station, populating, by the first base station, the bit, which is in the preset field of the MAC CE for activating/deactivating retransmission and corresponding to the bearer, thereby generating the MAC CE for activating/deactivating retransmission, and transmitting the generated MAC CE for activating/deactivating retransmission to the UE — 42

FIG. 4

RETRANSMISSION ACTIVATING/DEACTIVATING METHOD, BASE STATION, USER EQUIPMENT AND DEVICE

CROSS-REFERENCE TO RELATED APPLICATION

This application is the U.S. national phase of PCT Application PCT/CN2018/098518 filed on Aug. 3, 2018, which claims the benefit and priority of Chinese Application No. 201710737578.9, filed on Aug. 24, 2017, which is incorporated herein by reference in its entirety.

TECHNICAL FIELD

The present disclosure relates to the field of communication technologies, and in particular to a retransmission activating/deactivating method, a base station, a user equipment and a device.

BACKGROUND

5G New Radio (NR) system mainly supports three types of services: enhanced Mobile Broadband (eMBB), massive Machine Type Communications (mMTC) and Ultra-Reliable and Low Latency Communications (URLLC).

The URLLC has relatively high requirements on delay and reliability, and one solution provided by 3GPP is to introduce a retransmission mechanism, that is, to transmit the same Packet Data Convergence Protocol (PDCP) Protocol Data Unit (PDU) through multiple paths. Transmission reliability can be improved and transmission delay can be reduced, through multipath transmission gain. The introduced PDCP retransmission is applicable not only to the URLLC service but also to other services.

Retransmission models under Carrier aggregation (CA) and Dual connectivity (DC) are shown in FIG. 1 and FIG. 2, respectively. A radio bearer (corresponding to a PDCP entity) in the PDCP layer is transmitted through multiple logical channels (one logical channel is corresponding to one RLC entity) in the Radio Link Control Protocol (RLC) layer, respectively. As shown in FIG. 1, for the CA model, multiple logical channels corresponding to the radio bearer for retransmission are processed by one MAC entity in the MAC layer; and data from different RLC logical channels are respectively mapped to different radio resources on one carrier or different carriers, for transmission. As shown in FIG. 2, for the DC model, multiple logical channels corresponding to a duplication RB are mapped to different MAC entities; and data from multiple different RLC logical channels can be respectively mapped to different radio resources or carriers, for transmission.

Currently, the retransmission mechanism is implemented through network-side configuration, that is, the network side configures which bearers (RBs) can be used for retransmission, and configures corresponding various layers (such as PDCP entity and RLC entity) for the specific RB (corresponding to an RB identity). Then, the network side uses MAC layer signaling MAC CE (i.e., MAC CE for activating/deactivating retransmission) to activate/deactivate retransmission. In the network deployment, the DC and CA configurations generally coexist. For bearers of a terminal, there may be several types of retransmission bearer configurations as shown in FIG. 3. DRB1 and DRB4 are CA retransmissions in Master Cell Group (MCG) and Secondary Cell Group (SCG), respectively; DRB2 and DRB3 are DC retransmissions in MCG and SCG respectively. The MCG and the SCG belong to different base stations (5G base stations), i.e., a base station 1 and a base station 2, and both of the base station 1 and the base station 2 can transmit the MAC CE to activate and deactivate bearers for retransmission.

In summary, different network nodes can transmit activation/deactivation retransmission MAC CEs to a user equipment (UE) for activating or deactivating bearers for retransmission. Different network nodes do not collaborate with another when they transmit activation/deactivation retransmission MAC CEs, and content transmitted by them may be contradictory. Currently, there is no way to solve problems that how the UE operates correctly when different network nodes transmit different activation/deactivation retransmission MAC CEs.

SUMMARY

An object of the present disclosure is to provide a retransmission activating/deactivating method, a base station, a user equipment and a device, to solve the problem of erroneous operations at the UE caused by misunderstanding at the base station and the UE caused by that different network nodes transmit different MAC CEs for activating/deactivating retransmission in the related art.

In order to solve the above problem, one embodiment of the present disclosure provides a retransmission activating/deactivating method, applied to a first base station in communication with a user equipment (UE), including: determining a correspondence relationship between a bearer which is allowed for retransmission under the first base station and a bit of a preset field of media access control (MAC) control element (CE) of the first base station for activating/deactivating retransmission; wherein the preset field is used to indicate activation/deactivation retransmission of the bearer which is allowed for retransmission; and when determining to activate/deactivate retransmission of the bearer which is allowed for retransmission under the first base station, populating, by the first base station, the bit, which is in the preset field of the MAC CE for activating/deactivating retransmission and corresponding to the bearer, thereby generating the MAC CE for activating/deactivating retransmission, and transmitting to the UE the generated MAC CE for activating/deactivating retransmission.

Optionally, the step of determining a correspondence relationship between a bearer which is allowed for retransmission under the first base station and a bit of a preset field of media access control (MAC) control element (CE) of the first base station for activating/deactivating retransmission; wherein the preset field is used to indicate activation/deactivation retransmission of the bearer which is allowed for retransmission, includes: configuring, by the first base station, the correspondence relationship between the bit in the preset field of the MAC CE of the first base station for activating/deactivating retransmission, and the bearer which is allowed for retransmission under the first base station; and, transmitting, by the first base station, the configured correspondence relationship to the UE.

Optionally, the method further includes: configuring, by the first base station, a correspondence relationship between a bit in a preset field of MAC CE from another base station in communication with the UE for activating/deactivating retransmission, and a bearer which is allowed for retransmission under the another base station; and, transmitting, by the first base station, the configured correspondence relationship to the UE; and/or, transmitting, by the first base station, the configured correspondence relationship to the corresponding base station.

Optionally, the preset field of the MAC CE from the first base station for activating/deactivating retransmission has the same structure as a preset field of MAC CE from another base station in communication with the UE for activating/deactivating retransmission; and, bits in each of the preset fields having the same structure of MAC CEs for activating/deactivating retransmission, have correspondence relationship with all bearers which are allowed for retransmission under the UE.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission under the first base station; bits in the preset field of the MAC CE from another base station for activating/deactivating retransmission, have correspondence relationship with bearers which are allowed for retransmission under the another base station.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission only under the first base station; and, bits in the preset field of the MAC CE from the first base station for activating/deactivating retransmission, have correspondence relationship with special bearers which are allowed for retransmission under the first base station; wherein the special bearers are retransmitted in a dual-connectivity manner or multi-connectivity mode, and a master base station for the special bearers is the first base station.

One embodiment of the present disclosure provides a retransmission activating/deactivating method, applied to a user equipment (UE) in communication with multiple base stations, including: determining a correspondence relationship between a bearer which is allowed for retransmission under a first base station and a bit of a preset field of media access control (MAC) control element (CE) of the first base station for activating/deactivating retransmission; wherein the preset field is used to indicate activation/deactivation retransmission of the bearer which is allowed for retransmission; and, when receiving the MAC CE for activating/deactivating retransmission transmitted from the first base station, according to the correspondence relationship, parsing the bit, which is in the preset field of the MAC CE of the first base station for activating/deactivating retransmission and corresponding to the bearer which is allowed for retransmission under the first base station; according to indication of the bit, determining activation/deactivation retransmission of the corresponding bearer.

Optionally, the step of determining a correspondence relationship between a bearer which is allowed for retransmission under the first base station and a bit of a preset field of media access control (MAC) control element (CE) of the first base station for activating/deactivating retransmission, includes: receiving the correspondence relationship configured by the first base station between the bit in the preset field of the MAC CE of the first base station for activating/deactivating retransmission, and the bearer which is allowed for retransmission under the first base station.

Optionally, the method further includes: receiving a correspondence relationship configured by the first base station between a bit in a preset field of MAC CE from another base station in communication with the UE for activating/deactivating retransmission, and a bearer which is allowed for retransmission under the another base station.

Optionally, the method further includes: when receiving the MAC CE for activating/deactivating retransmission transmitted from another base station, according to the correspondence relationship, parsing the bit, which is in the preset field of the MAC CE of the another base station for activating/deactivating retransmission and corresponding to the bearer which is allowed for retransmission under the another base station; according to indication of the bit, determining activation/deactivation retransmission of the corresponding bearer.

Optionally, the preset field of the MAC CE from the first base station for activating/deactivating retransmission has the same structure as a preset field of MAC CE from another base station in communication with the UE for activating/deactivating retransmission; and bits in each of the preset fields having the same structure of MAC CEs for activating/deactivating retransmission, have correspondence relationship with all bearers which are allowed for retransmission under the UE.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission under the first base station; bits in the preset field of the MAC CE from another base station for activating/deactivating retransmission, have correspondence relationship with bearers which are allowed for retransmission under the another base station.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission only under the first base station; and, bits in the preset field of the MAC CE from the first base station for activating/deactivating retransmission, have correspondence relationship with special bearers which are allowed for retransmission under the first base station; wherein the special bearers are retransmitted in a dual-connectivity manner or multi-connectivity mode, and a master base station for the special bearers is the first base station.

One embodiment of the present disclosure provides a base station, including: a transceiver, a memory, a processor, and a computer program stored on the memory and executable on the processor; wherein the processor is used to read the program in the memory and perform the following procedures: determining a correspondence relationship between a bearer which is allowed for retransmission under a first base station and a bit of a preset field of media access control (MAC) control element (CE) of the first base station for activating/deactivating retransmission; wherein the preset field is used to indicate activation/deactivation retransmission of the bearer which is allowed for retransmission; when determining to activate/deactivate retransmission of the bearer which is allowed for retransmission under the first base station, populating, by the first base station, the bit, which is in the preset field of the MAC CE for activating/deactivating retransmission and corresponding to the bearer, thereby generating the MAC CE for activating/deactivating retransmission; transmitting, by the transceiver, the generated MAC CE for activating/deactivating retransmission to the UE.

Optionally, the processor is further used to perform the following procedures: configuring the correspondence relationship between the bit in the preset field of the MAC CE of the first base station for activating/deactivating retransmission, and the bearer which is allowed for retransmission under the first base station; and, transmitting, by the transceiver, the configured correspondence relationship to the UE.

Optionally, the processor is further used to perform the following procedures: configuring a correspondence relationship between a bit in a preset field of MAC CE from another base station in communication with the UE for activating/deactivating retransmission, and a bearer which is allowed for retransmission under the another base station; and transmitting, by the transceiver, the configured correspondence relationship to the UE; and/or, transmitting, by the transceiver, the configured correspondence relationship to the corresponding base station.

Optionally, the preset field of the MAC CE from the first base station for activating/deactivating retransmission has the same structure as a preset field of MAC CE from another base station in communication with the UE for activating/deactivating retransmission; and bits in each of the preset fields having the same structure of MAC CEs for activating/deactivating retransmission, have correspondence relationship with all bearers which are allowed for retransmission under the UE.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission under the first base station; bits in the preset field of the MAC CE from another base station for activating/deactivating retransmission, have correspondence relationship with bearers which are allowed for retransmission under the another base station.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission only under the first base station; and bits in the preset field of the MAC CE from the first base station for activating/deactivating retransmission, have correspondence relationship with special bearers which are allowed for retransmission under the first base station; wherein the special bearers are retransmitted in a dual-connectivity manner or multi-connectivity mode, and a master base station for the special bearers is the first base station.

One embodiment of the present disclosure provides a computer readable storage medium including a computer program stored thereon; wherein the computer program is executed by a processor to implement steps of the above retransmission activating/deactivating method.

One embodiment of the present disclosure provides a retransmission activating/deactivating device, applied to a first base station in communication with a user equipment (UE), including: a first relationship determining module used to determine a correspondence relationship between a bearer which is allowed for retransmission under the first base station and a bit of a preset field of media access control (MAC) control element (CE) of the first base station for activating/deactivating retransmission; wherein the preset field is used to indicate activation/deactivation retransmission of the bearer which is allowed for retransmission; and a generation-transmission module used to, when determining to activate/deactivate retransmission of the bearer which is allowed for retransmission under the first base station, populate, by the first base station, the bit, which is in the preset field of the MAC CE for activating/deactivating retransmission and corresponding to the bearer, thereby generating the MAC CE for activating/deactivating retransmission, and transmitting the generated MAC CE for activating/deactivating retransmission to the UE.

One embodiment of the present disclosure provides a user equipment (UE), including: a transceiver, a memory, a processor, and a computer program stored on the memory and executable on the processor; wherein the processor is used to read the program in the memory and perform the following procedures: determining a correspondence relationship between a bearer which is allowed for retransmission under a first base station and a bit of a preset field of media access control (MAC) control element (CE) of the first base station for activating/deactivating retransmission; wherein the preset field is used to indicate activation/deactivation retransmission of the bearer which is allowed for retransmission; the transceiver is used to receive the MAC CE for activating/deactivating retransmission transmitted from the first base station; wherein the processor is further used to perform the following procedures: according to the correspondence relationship, parsing the bit, which is in the preset field of MAC CE of the first base station for activating/deactivating retransmission and corresponding to the bearer which is allowed for retransmission under the first base station; and, according to indication of the bit, determining activation/deactivation retransmission of the corresponding bearer.

Optionally, the transceiver is further used to receive a correspondence relationship configured by the first base station between the bit in the preset field of the MAC CE of the first base station for activating/deactivating retransmission, and the bearer which is allowed for retransmission under the first base station.

Optionally, the transceiver is further used to receive a correspondence relationship configured by the first base station between a bit in a preset field of MAC CE from another base station in communication with the UE for activating/deactivating retransmission, and a bearer which is allowed for retransmission under the another base station.

Optionally, the transceiver is further used to receive the MAC CE for activating/deactivating retransmission transmitted from another base station; wherein the processor is further used to perform the following procedures: according to the correspondence relationship, parsing the bit, which is in the preset field of the MAC CE of the another base station for activating/deactivating retransmission and corresponding to the bearer which is allowed for retransmission under the another base station; according to indication of the bit, determining activation/deactivation retransmission of the corresponding bearer.

Optionally, the preset field of the MAC CE from the first base station for activating/deactivating retransmission has the same structure as a preset field of MAC CE from another base station in communication with the UE for activating/deactivating retransmission; and bits in each of the preset fields having the same structure of MAC CEs for activating/deactivating retransmission, have correspondence relationship with all bearers which are allowed for retransmission under the UE.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission under the first base station; bits in the preset field of the MAC CE from another base station for activating/deactivating retransmission, have correspondence relationship with bearers which are allowed for retransmission under the another base station.

Optionally, the preset field of the MAC CE from the first base station for activating/deactivating retransmission, and a preset field of MAC CE from another base station in communication with the UE for activating/deactivating retransmission, have mutually independent structures; bits in the preset field of the MAC CE from the first base station for activating/deactivating retransmission, have correspondence relationship with bearers which are allowed for retransmission only under the first base station; and bits in the preset field of the MAC CE from the first base station for activating/deactivating retransmission, have correspondence relationship with special bearers which are allowed for retransmission under the first base station; wherein the special bearers are retransmitted in a dual-connectivity manner or multi-connectivity mode, and a master base station for the special bearers is the first base station.

One embodiment of the present disclosure provides a computer readable storage medium including a computer program stored thereon; wherein the computer program is executed by a processor to implement steps of the above retransmission activating/deactivating method.

One embodiment of the present disclosure provides a retransmission activating/deactivating device, applied to a user equipment (UE) in communication with multiple base stations, including: a second relationship determining module used to determine a correspondence relationship between a bearer which is allowed for retransmission under a first base station and a bit of a preset field of media access control (MAC) control element (CE) of the first base station for activating/deactivating retransmission; wherein the preset field is used to indicate activation/deactivation retransmission of the bearer which is allowed for retransmission; a first parsing module used to, when receiving the MAC CE for activating/deactivating retransmission transmitted from the first base station, according to the correspondence relationship, parse the bit, which is in the preset field of the MAC CE of the first base station for activating/deactivating retransmission and corresponding to the bearer which is allowed for retransmission under the first base station; a first processing module used to determine activation/deactivation retransmission of the corresponding bearer according to indication of the bit.

The above technical solutions of the present disclosure have at least the following beneficial effects.

In the above technical solutions of the embodiments of the present disclosure, the base station configures in advance the correspondence relationship between the bearers allowed for retransmission and bits of the preset field of MAC CE for activating/deactivating retransmission, and transmits the configured correspondence relationship to the UE. Further, the base station only indicates activation/deactivation retransmission of the bearer which is allowed for retransmission under the local base station itself. Accordingly, the UE activates/deactivates retransmission of corresponding bearer, according to the base station which transmits the MAC CE for activating/deactivating retransmission as well as the correspondence relationship configured in advance. In this way, when the UE is in communication with multiple base stations; the UE can correctly receive and activate/deactivate retransmission of bearers of different types, thereby effectively implementing retransmission and avoiding problem of erroneous operation caused by misunderstanding at the base station and the UE, and improving resource transmission efficiency and data transmission accuracy.

BRIEF DESCRIPTION OF THE DRAWINGS

FIG. 3 is a principle diagram of retransmission performed by multiple base stations in the related art;

FIG. 4 is a first flowchart of a retransmission activating/deactivating method according to an embodiment of the present disclosure;

DETAILED DESCRIPTION

Figure 1:
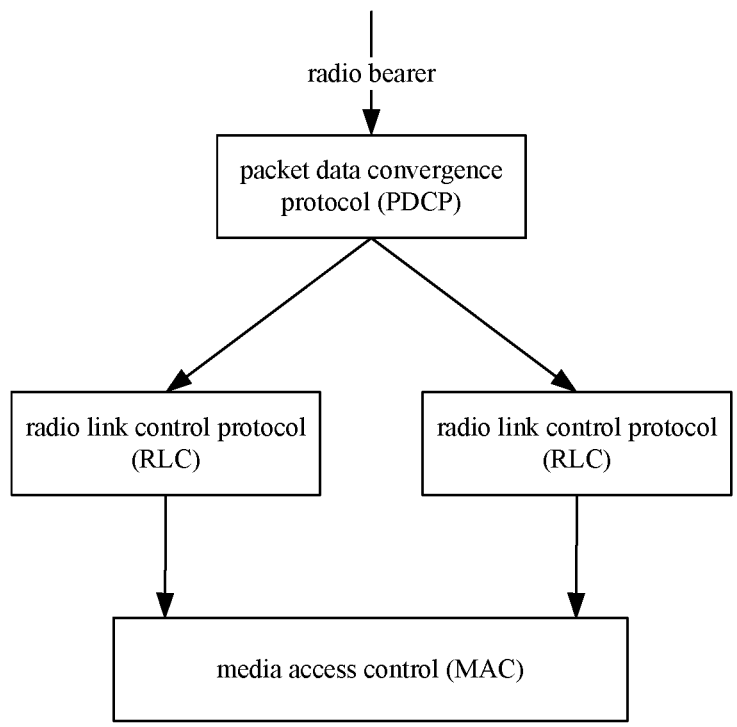
FIG. 1 is a schematic diagram of retransmission model under Carrier aggregation (CA) in the related art.
Figure 2:
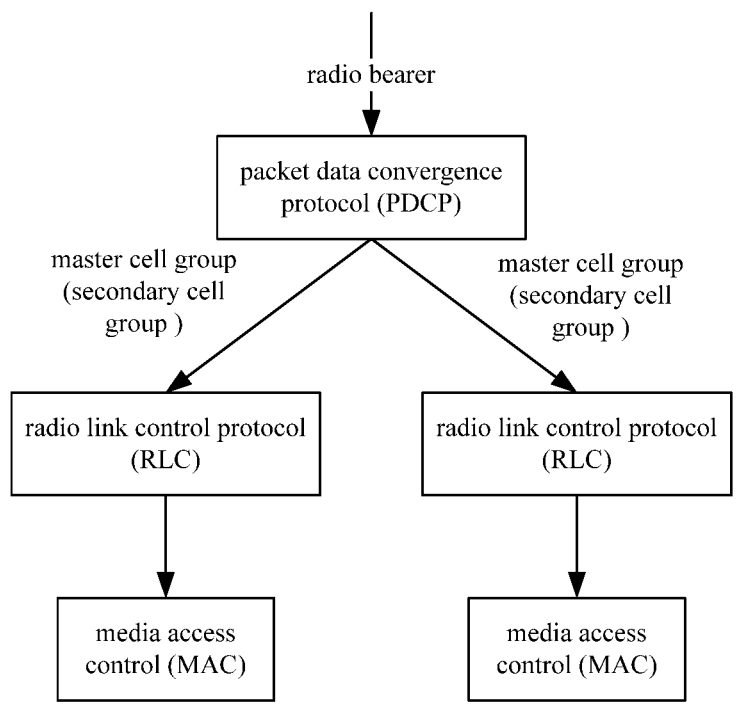
FIG. 2 is a schematic diagram of retransmission model under Dual connectivity (DC) in the related art.

In order to make the technical problems to be solved, the technical solutions and the advantages of the present disclosure more apparent, the present disclosure will be described hereinafter in a clear and complete manner in conjunction with the drawings and embodiments.

As shown in FIG. 4, one embodiment of the present disclosure provides a retransmission activating/deactivating method, which is applied to a first base station in communication with a user equipment (UE). The method includes the following steps.

Step 41: determining a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission.

In this step, the preset field is specifically a bitmap field in the MAC CE for activating/deactivating retransmission. The bitmap field is generally 8 bits, and generally may be used to indicate activation/deactivation retransmission of up to 8 bearers. It should be noted that the bitmap field may be set as an extend field, and then the base station may extend the size of the bitmap field according to its actual needs, thereby expanding the number of bearers that can be indicated.

Step 42: when determining to activate/deactivate retransmission of the bearer which is allowed for retransmission under the first base station, populating, by the first base station, the bit, which is in the preset field of the MAC CE for activating/deactivating retransmission and corresponding to the bearer, thereby generating the MAC CE for activating/deactivating retransmission, and transmitting the generated MAC CE for activating/deactivating retransmission to the UE.

In the above embodiment of the present disclosure, the base station only indicates activation/deactivation retransmission of the bearer which is allowed for retransmission under the local base station itself. For example, bearers which are allowed for retransmission under the first base station includes DRB1 and DRB2, then two bits (including a first bit and a second bit) in the preset field of the MAC CE from the first base station for activating/deactivating retransmission have correspondence relationship with DRB1 and DRB2, respectively. The first bit is used to indicate activation/deactivation retransmission of DRB1. The second bit is used to indicate activation/deactivation retransmission of DRB2. It should be noted that functions of other bits in the preset field of the MAC CE from the first base station for activating/deactivating retransmission are not defined herein, but other bits in the preset field of the MAC CE from the first base station for activating/deactivating retransmission are not used for valid indication of activation/deactivation retransmission of bearers which are allowed for retransmission under other base stations. The DRB specifically refers to a data bearer.

It should be further noted that the bearer RB which is allowed for retransmission may be a data bearer DRB or a signaling bearer SRB, which is not specifically limited herein. For clarity of description in the following embodiments of the present disclosure, bearer RBs allowed for retransmission are assumed to be data bearer DRBs.

As the base station only indicates activation/deactivation retransmission of the bearer which is allowed for retransmission under the local base station itself, after the UE receives the MAC CE for activating/deactivating retransmission, the UE determines a valid bit in the preset field according to the base station which transmits the MAC CE for activating/deactivating retransmission, and only activates/deactivates the bear indicated by the base station which transmits the MAC CE for activating/deactivating retransmission. In other words, the MAC CE for activating/deactivating retransmission, which is transmitted from one base station, cannot activate/deactivate bears of other base stations. This avoids misunderstanding of the MAC CE for activating/deactivating retransmission at the base station and the UE, thereby effectively implementing retransmission.

Further, in the above embodiment of the present disclosure, the step 41 includes:

configuring, by the first base station, the correspondence relationship between the bit in the preset field of the MAC CE of the first base station for activating/deactivating retransmission, and the bearer which is allowed for retransmission under the first base station; and transmitting, by the first base station, the configured correspondence relationship to the UE.

Specifically, the base station configures the correspondence relationship between the bearer which is allowed for retransmission under the local base station and the bit in the preset field of the MAC CE of the local base station for activating/deactivating retransmission. For example, bearers which are allowed for retransmission under the first base station includes DRB1 and DRB2, then two bits (including a first bit and a second bit) in the preset field of the MAC CE from the first base station for activating/deactivating retransmission have correspondence relationship with DRB1 and DRB2, respectively. The first bit is used to indicate activation/deactivation of DRB1. The second bit is used to indicate activation/deactivation of DRB2.

Further, in the above embodiment of the present disclosure, the method further includes:

configuring, by the first base station, a correspondence relationship between a bit in a preset field of MAC CE from another base station in communication with the UE for activating/deactivating retransmission, and a bearer which is allowed for retransmission under the another base station; and transmitting, by the first base station, the configured correspondence relationship to the UE; and/or, transmitting, by the first base station, the configured correspondence relationship to the corresponding base station.

Specifically, the base station can not only configure the correspondence relationship between the bearer which is allowed for retransmission under the local base station and the bit in the preset field of the MAC CE of the local base station for activating/deactivating retransmission, but also configure the correspondence relationship between the bearer which is allowed for retransmission under the another base station and the bit in the preset field of MAC CE from another base station for activating/deactivating retransmission.

For example, bearers which are allowed for retransmission under the another base station (referred as second base station) includes DRB3 and DRB4, then the first base station configures correspondence relationship between the two bits (including a first bit and a second bit) in the preset field of the MAC CE from the second base station for activating/deactivating retransmission and DRB3 and DRB4. The first base station configures that the first bit in the preset field is used to indicate activation/deactivation of DRB3 and the second bit in the preset field is used to indicate activation/deactivation of DRB4.

It should be noted that the correspondence relationship between the bit in the preset field of MAC CE from the second base station for activating/deactivating retransmission and the bearer which is allowed for retransmission under the second base station may also be configured by the second base station itself, which is not specifically limited herein. The correspondence relationship between the bit in the preset field of MAC CE from the first base station for activating/deactivating retransmission and the bearer which is allowed for retransmission under the first base station may also be configured by another base station, which is not specifically limited herein.

The above embodiment of the present disclosure provides three manners in which the base station transmits MAC CE for activating/deactivating retransmission, which are as follows.

First manner, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Since both of the first base station and the another base station are in communication with the UE, the preset fields of MAC CEs for activating/deactivating retransmission, which are transmitted to the UE from all base stations that are in communication with the UE, have the same structure. Then, bits in the preset field of MAC CE for activating/deactivating retransmission, have correspondence relationship with all bearers which are allowed for retransmission under the UE. All bearers which are allowed for retransmission under the UE, include the bearer which is allowed for retransmission under the first base station.

For example, UE A is communicated with a base station B, a base station C and a base station D, respectively, then, all bearers which are allowed for retransmission under the UE A include: bearers which are allowed for retransmission between the UE A and the base station B, bearers which are allowed for retransmission between the UE A and the base station C, and bearers which are allowed for retransmission between the UE A and the base station D.

In summary, in the first manner, different base stations (i.e., network side nodes) use the same configuration for MAC CE for activating/deactivating retransmission, that is, correspondence relationship between bits of the bitmap in the MAC CE and bearers RB are the same in different base stations (although some RBs are transmitted only under certain base stations).

Figure 5:
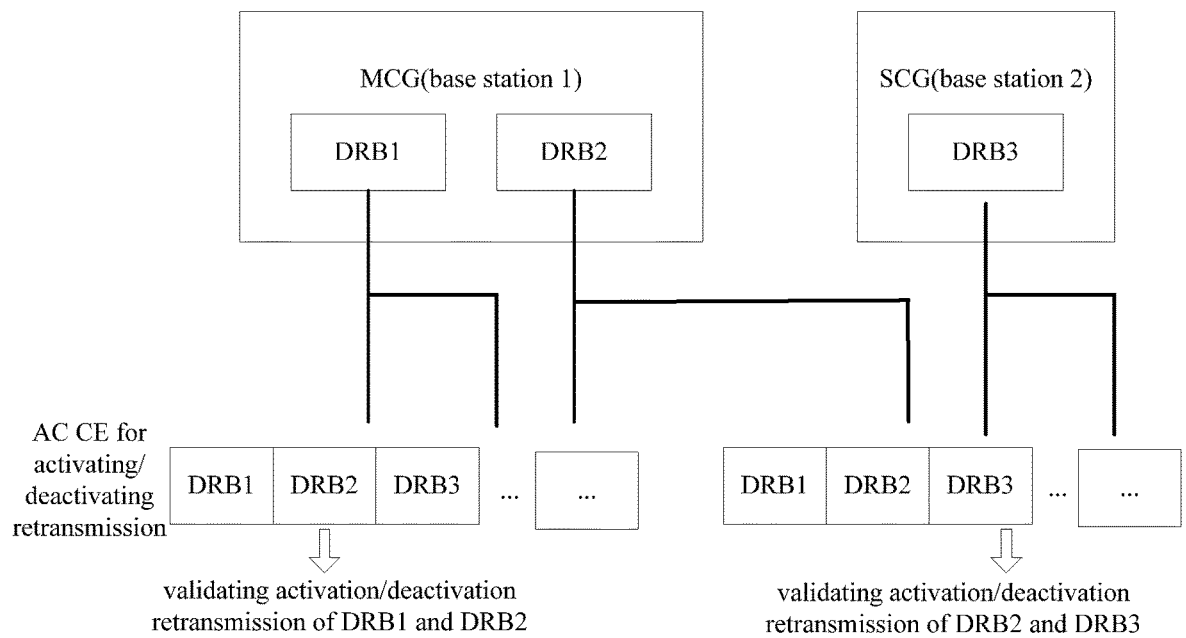
FIG. 5 is a first schematic diagram of MAC CE in a retransmission activating/deactivating method according to an embodiment of the present disclosure.

As shown in FIG. 5, the base station 1 configures retransmissions of DRB1 and DRB2, and the base station 2 configures retransmissions of DRB2 and DRB3. Formats of MAC CEs for activating/deactivating retransmission are the same under the base station 1 and the base station 2. That is, the same bitmap indication mode is adopted, and first three bits are used to indicate DRB1, DRB2 and DRB3, respectively. When the base station 1 transmits MAC CE for activating/deactivating retransmission, the UE validates only indication of bits corresponding to DRB1 and DRB2, and then activates or deactivates retransmission of the corresponding DRB. When the base station 2 transmits MAC CE for activating/deactivating retransmission, the UE validates only indication of bits corresponding to DRB2 and DRB3, and then activates or deactivates retransmission of the corresponding DRB. Only valid bits of the bitmap in the MAC CE for activating/deactivating retransmission are shown in the figure.

Further, as shown in FIG. 5, the correspondence relationship between bits in each of the preset fields having the same structure of MAC CEs for activating/deactivating retransmission, and all bearers which are allowed for retransmission under the UE, may be configured by the base station 1, or by the base station 2, or by the base station 1 and the base station 2 together.

The correspondence relationship between bits of the bitmap in the MAC CE for activating/deactivating retransmission and bearers RB may be configured by one base station. For example, in the figure, first three bits of the bitmap in the MAC CE may be configured by the base station 1 to correspond to DRB1, DRB2, and DRB3.

Alternatively, the correspondence relationship between bits of the bitmap in the MAC CE for activating/deactivating retransmission and bearers RB may be configured by multiple base stations. For example, in the figure, first two bits of the bitmap in the MAC CE may be configured by the base station 1 to correspond to DRB1 and DRB2; the third bit of the bitmap in the MAC CE may be configured by the base station 2 to correspond to DRB3.

Second manner, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Figure 6:
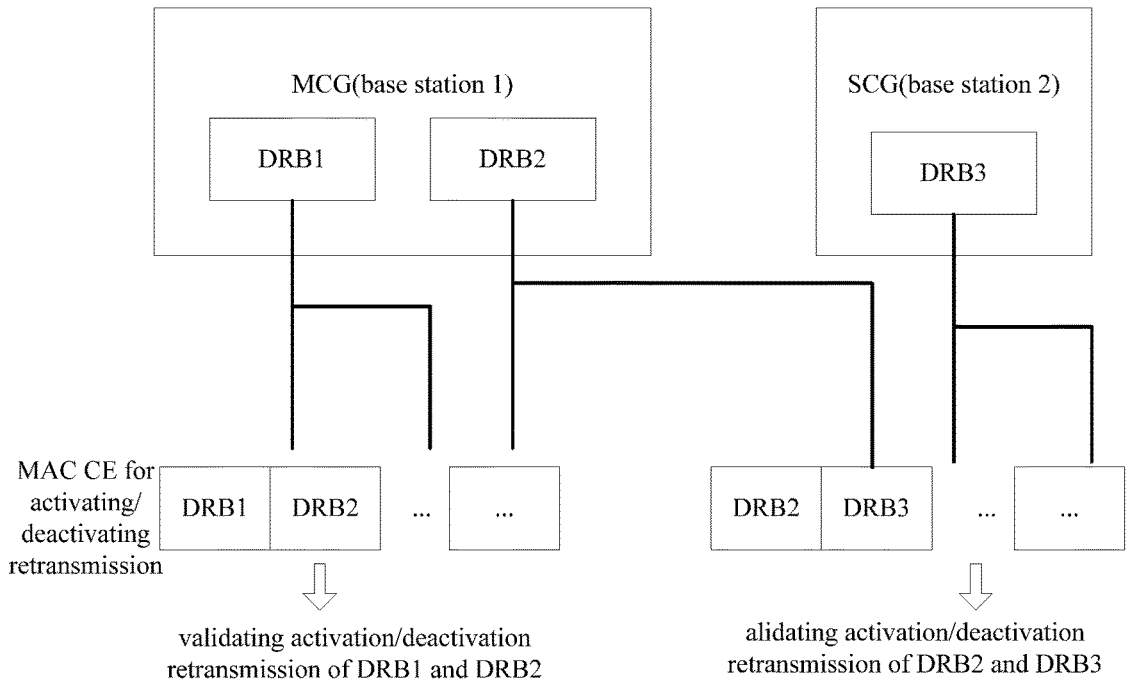
FIG. 6 is a second schematic diagram of MAC CE in a retransmission activating/deactivating method according to an embodiment of the present disclosure.

Specifically, different base stations use independent configurations for MAC CEs for activating/deactivating retransmission, that is, correspondence relationship between bits of the bitmap in the MAC CE and RBs may be varied according to RBs configured by various base stations. An invalid DRB under one base station will not be indicated in the MAC CE from the one base station for activating/deactivating retransmission. As shown in FIG. 6, the base station 1 configures retransmissions of DRB1 and DRB2, and the base station 2 configures retransmissions of DRB2 and DRB3. Formats of MAC CEs for activating/deactivating retransmission are different under the base station 1 and the base station 2. When the base station 1 transmits MAC CE for activating/deactivating retransmission, the first two bits of the MAC CE indicate DRB1 and DRB2, respectively, and then the UE activates or deactivates retransmission of the corresponding DRB. When the base station 2 transmits MAC CE for activating/deactivating retransmission, the first two bits of the MAC CE indicate DRB2 and DRB3, respectively, and then the UE activates or deactivates retransmission of the corresponding DRB. Only valid bits of the bitmap in the MAC CE for activating/deactivating retransmission are shown in the figure.

Further, as shown in FIG. 6, structures of preset fields having independent structures of MAC CEs from different base stations for activating/deactivating retransmission, may be configured by the base station 1, or by the base station 2, or by the base station 1 and the base station 2 together.

The correspondence relationship between bits of the bitmap in the MAC CE for activating/deactivating retransmission and RBs may be configured by one base station. In this embodiment, for different cell groups CG (master cell group MCG or secondary cell group SCG), different correspondence relationship may be configured, respectively. For example, in FIG. 6, the base station 1 may configure that the first two bits of the MAC CE from the base station 1 for activating/deactivating retransmission are corresponding to DRB1 and DRB2, respectively; and the base station 1 may configure that the first two bits of the MAC CE from the base station 2 for activating/deactivating retransmission are corresponding to DRB2 and DRB3, respectively.

Alternatively, the correspondence relationship between bits of the bitmap in the MAC CE for activating/deactivating retransmission and RBs may be configured by multiple base stations. In this embodiment, the base station 1 configures MAC CE from the base station 1 for activating/deactivating retransmission, and the first two bits of the bitmap in the MAC CE may be corresponding to DRB1 and DRB2. The base station 2 configures MAC CE from the base station 2 for activating/deactivating retransmission, and the first two bits of the bitmap in the MAC CE may be corresponding to DRB2 and DRB3.

Third manner, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station. Specifically, a base station where PDCP layer of the specific bearer is located is the master base station for the special bearer.

Specifically, different base stations use independent configurations for MAC CEs for activating/deactivating retransmission, that is, correspondence relationship between bits of the bitmap in the MAC CE and RBs may be varied according to RBs configured by various base stations. Meanwhile, for RB of dual-connectivity or multi-connectivity (i.e., RB which may be transmitted through one or more base stations and is allowed for retransmission), only one master base station can indicate activation/deactivation retransmission.

Figure 7:
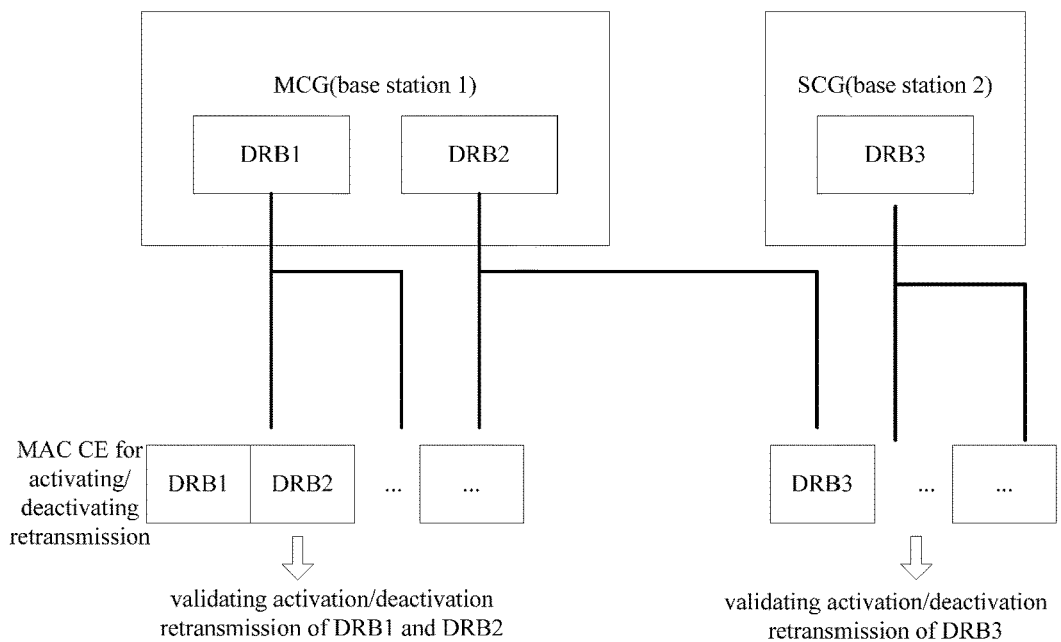
FIG. 7 is a third schematic diagram of MAC CE in a retransmission activating/deactivating method according to an embodiment of the present disclosure.

An invalid RB under one base station will not be indicated in the MAC CE from the one base station for activating/deactivating retransmission. As shown in FIG. 7, the base station 1 configures retransmissions of DRB1 and DRB2, the base station 2 configures retransmissions of DRB2 and DRB3, and only the master base station (i.e., the base station 1) can activate/deactivate retransmission of DRB2. Formats of MAC CEs for activating/deactivating retransmission are different under the base station 1 and the base station 2. When the base station 1 transmits MAC CE for activating/deactivating retransmission, the first two bits of the MAC CE indicate DRB1 and DRB2, respectively, and then the UE activates or deactivates retransmission of the corresponding DRB. When the base station 2 transmits MAC CE for activating/deactivating retransmission, the first bit of the MAC CE indicate DRB3, and then the UE activates or deactivates retransmission of the corresponding DRB. Only valid bits of the bitmap in the MAC CE for activating/deactivating retransmission are shown in the figure.

Further, as shown in FIG. 7, structures of preset fields having independent structures of MAC CEs from different base stations for activating/deactivating retransmission, may be configured by the base station 1, or by the base station 2, or by the base station 1 and the base station 2 together.

The correspondence relationship between bits of the bitmap in the MAC CE for activating/deactivating retransmission and RBs may be configured by one base station. In this embodiment, for different cell groups CG (master cell group MCG or secondary cell group SCG), different correspondence relationship may be configured, respectively. For example, in FIG. 7, the base station 1 may configure that the first two bits of the MAC CE from the base station 1 for activating/deactivating retransmission are corresponding to DRB1 and DRB2, respectively; and the base station 1 may configure that the first bit of the MAC CE from the base station 2 for activating/deactivating retransmission is corresponding to DRB3. In this embodiment, DRB2 is a dual-connectivity RB, and only one base station (i.e., the base station 1 in this embodiment) can activate or deactivate retransmission of DRB2; and the base station 2 cannot activate or deactivate retransmission of DRB2.

Alternatively, the correspondence relationship between bits of the bitmap in the MAC CE for activating/deactivating retransmission and RBs may be configured by multiple base stations. In this embodiment, the base station 1 configures MAC CE from the base station 1 for activating/deactivating retransmission, and the first two bits of the bitmap in the MAC CE may be corresponding to DRB1 and DRB2. The base station 2 configures MAC CE from the base station 2 for activating/deactivating retransmission, and the first bit of the bitmap in the MAC CE may be corresponding to D DRB3. In this embodiment, DRB2 is a dual-connectivity RB, and only one base station (i.e., the base station 1 in this embodiment) can activate or deactivate retransmission of DRB2; and the base station 2 cannot activate or deactivate retransmission of DRB2.

In summary, in the retransmission activating/deactivating method provided in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. Further, the base station only indicates activation/deactivation retransmission of the bearer which is allowed for retransmission under the local base station itself. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

Figure 8:
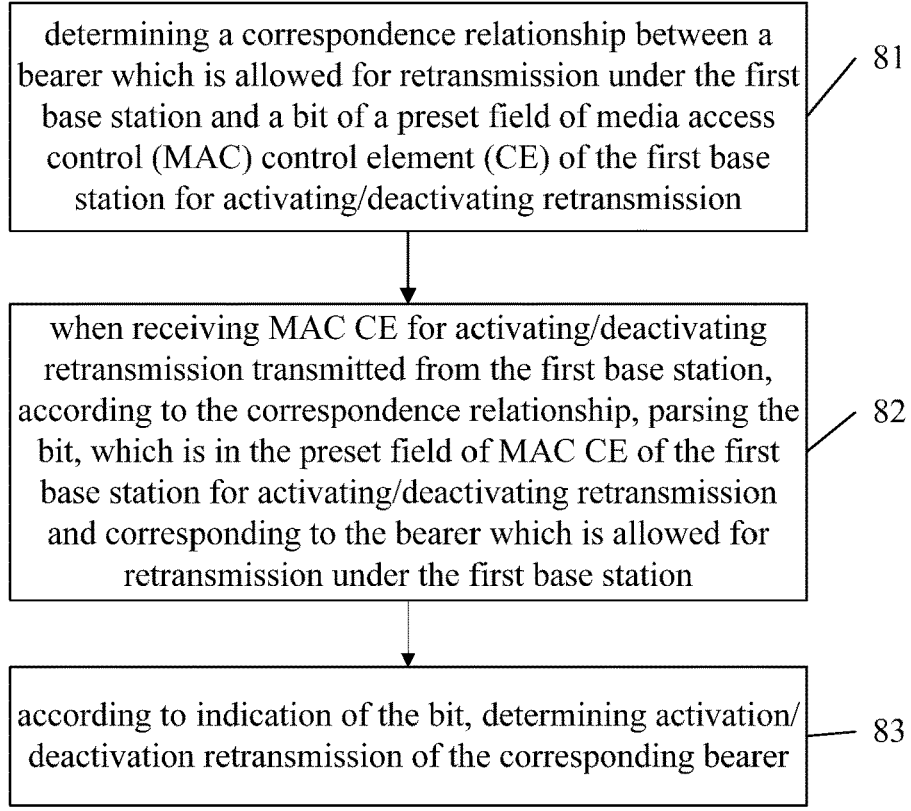
FIG. 8 is a second flowchart of a retransmission activating/deactivating method according to an embodiment of the present disclosure.

As shown in FIG. 8, one embodiment of the present disclosure provides a retransmission activating/deactivating method, which is applied to a user equipment (UE) in communication with multiple base stations. The method includes the following steps.

Step 81: determining a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission.

In this step, the preset field is specifically a bitmap field in the MAC CE for activating/deactivating retransmission. The bitmap field is generally 8 bits, and generally may be used to indicate activation/deactivation retransmission of up to 8 bearers. It should be noted that the bitmap field may be set as an extend field, and then the base station may extend the size of the bitmap field according to its actual needs, thereby expanding the number of bearers that can be indicated.

Step 82: when receiving MAC CE for activating/deactivating retransmission transmitted from the first base station, according to the correspondence relationship, parsing the bit, which is in the preset field of MAC CE of the first base station for activating/deactivating retransmission and corresponding to the bearer which is allowed for retransmission under the first base station;

Step 83: according to indication of the bit, determining activation/deactivation retransmission of the corresponding bearer.

In the above embodiment of the present disclosure, the UE receives in advance the correspondence relationship between the bearer allowed for retransmission and the bit in the preset field of MAC CE for activating/deactivating retransmission, which is configured by the base station. Then, when receiving MAC CE for activating/deactivating retransmission, the UE activates/deactivates retransmission of the corresponding bearer, according to the base station which transmits the MAC CE for activating/deactivating retransmission as well as the correspondence relationship between the bit in the preset field of MAC CE from the base station for activating/deactivating retransmission and the bearer.

According to the correspondence relationship configured by the base station, the UE can determine in advance a valid bit in the preset field of MAC CE transmitted by a certain base station for activating/deactivating retransmission, so that the UE parses only the valid bit and activates/deactivates retransmission of bearer corresponding to the valid bit. Further, since the base station uses only the valid bit to indicate activation/deactivation retransmission of the bearer which is allowed for retransmission under the local base station itself. This avoids misunderstanding of the MAC CE for activating/deactivating retransmission at the base station and the UE, thereby effectively implementing retransmission.

Further, in the above embodiment of the present disclosure, the step 81 includes:

receiving the correspondence relationship configured by the first base station between the bit in the preset field of the MAC CE of the first base station for activating/deactivating retransmission, and the bearer which is allowed for retransmission under the first base station.

Specifically, the base station configures the correspondence relationship between the bearer which is allowed for retransmission under the local base station and the bit in the preset field of the MAC CE of the local base station for activating/deactivating retransmission. For example, bearers which are allowed for retransmission under the first base station includes DRB1 and DRB2, then two bits (including a first bit and a second bit) in the preset field of the MAC CE from the first base station for activating/deactivating retransmission have correspondence relationship with DRB1 and DRB2, respectively. The first bit is used to indicate activation/deactivation of DRB 1. The second bit is used to indicate activation/deactivation of DRB2.

Further, in the above embodiment of the present disclosure, the method further includes:

receiving a correspondence relationship configured by the first base station between a bit in a preset field of MAC CE from another base station in communication with the UE for activating/deactivating retransmission, and a bearer which is allowed for retransmission under the another base station.

Specifically, the base station can not only configure the correspondence relationship between the bearer which is allowed for retransmission under the local base station and the bit in the preset field of the MAC CE of the local base station for activating/deactivating retransmission, but also configure the correspondence relationship between the bearer which is allowed for retransmission under the another base station and the bit in the preset field of MAC CE from another base station for activating/deactivating retransmission.

For example, bearers which are allowed for retransmission under the another base station (referred as second base station) includes DRB3 and DRB4, then the first base station configures correspondence relationship between the two bits (including a first bit and a second bit) in the preset field of the MAC CE from the second base station for activating/deactivating retransmission and DRB3 and DRB4. The first base station configures that the first bit in the preset field is used to indicate activation/deactivation of DRB3 and the second bit in the preset field is used to indicate activation/deactivation of DRB4.

It should be noted that the correspondence relationship between the bit in the preset field of MAC CE from the second base station for activating/deactivating retransmission and the bearer which is allowed for retransmission under the second base station may also be configured by the second base station itself, which is not specifically limited herein. The correspondence relationship between the bit in the preset field of MAC CE from the first base station for activating/deactivating retransmission and the bearer which is allowed for retransmission under the first base station may also be configured by another base station, which is not specifically limited herein.

Further, in the above embodiment of the present disclosure, the method further includes:

when receiving MAC CE for activating/deactivating retransmission transmitted from another base station, according to the correspondence relationship, parsing the bit, which is in the preset field of MAC CE of the another base station for activating/deactivating retransmission and corresponding to the bearer which is allowed for retransmission under the another base station;

according to indication of the bit, determining activation/deactivation retransmission of the corresponding bearer.

Specifically, when the UE receives MAC CE for activating/deactivating retransmission transmitted from one base station, the UE determines the valid bit in the MAC CE for activating/deactivating retransmission transmitted from the base station, according to the correspondence relationship configured in advance by the base station between the bit in the preset field of the MAC CE of the base station for activating/deactivating retransmission and the bearer which is allowed for retransmission under the base station. Then, the UE parses the valid bit and then activates/deactivates retransmission of corresponding bearer.

The above embodiment of the present disclosure provides three manners in which the base station transmits MAC CE for activating/deactivating retransmission, which are as follows.

First manner, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Since both of the first base station and the another base station are in communication with the UE, the preset fields of MAC CEs for activating/deactivating retransmission, which are transmitted to the UE from all base stations that are in communication with the UE, have the same structure. Then, bits in the preset field of MAC CE for activating/deactivating retransmission, have correspondence relationship with all bearers which are allowed for retransmission under the UE. All bearers which are allowed for retransmission under the UE, include the bearer which is allowed for retransmission under the first base station.

For example, UE A is communicated with a base station B, a base station C and a base station D, respectively, then, all bearers which are allowed for retransmission under the UE A include: bearers which are allowed for retransmission between the UE A and the base station B, bearers which are allowed for retransmission between the UE A and the base station C, and bearers which are allowed for retransmission between the UE A and the base station D.

Configuring the preset field of MAC CE for activating/deactivating retransmission in the first manner has been described in details in the method applied to the base station, which will not be elaborated herein. Following the above example, steps performed by the UE include:

receiving and validating configuration of correspondence relationship between RBs and bits of bitmap in MAC CE transmitted from the base station for activating/deactivating retransmission; for example, as shown in FIG. 5, first three bits of the bitmap in the MAC CE may be configured by the base station 1 to correspond to DRB1, DRB2, and DRB3; for another example, as shown in FIG. 5, first two bits of the bitmap in the MAC CE may be configured by the base station 1 to correspond to DRB1 and DRB2, and the third bit of the bitmap in the MAC CE may be configured by the base station 2 to correspond to DRB3;

receiving MAC CE transmitted from the base station for activating/deactivating retransmission, and activating/deactivating retransmission of corresponding RB according to indication of corresponding bit. For example, when the base station 1 transmits MAC CE for activating/deactivating retransmission, the UE activates/deactivates retransmission of DRB1 and DRB2 according to only indication of bits (first and second bits) corresponding to DRB1 and DRB2, and ignores the third bit of the bitmap in the MAC CE. When the base station 2 transmits MAC CE for activating/deactivating retransmission, the UE activates/deactivates retransmission of DRB2 and DRB3 according to only indication of bits (second and third bits) corresponding to DRB2 and DRB3, and ignores the first bit of the bitmap in the MAC CE.

Second manner, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Specifically, different base stations use independent configurations for MAC CEs for activating/deactivating retransmission, that is, correspondence relationship between bits of the bitmap in the MAC CE and RBs may be varied according to RBs configured by various base stations. An invalid DRB under one base station will not be indicated in the MAC CE from the one base station for activating/deactivating retransmission. Configuring the preset field of MAC CE for activating/deactivating retransmission in the second manner has been described in details in the method applied to the base station, which will not be elaborated herein. Following the above example, steps performed by the UE include:

receiving and validating configuration of correspondence relationship between RBs and bits of bitmap in MAC CE transmitted from the base station for activating/deactivating retransmission; for example, as shown in FIG. 6, the base station 1 configures correspondence relationship between RB and bitmap in MAC CE for activating/deactivating retransmission, transmitted from either of the base station 1 and the second base station 2, first two bits of bitmap in the MAC CE transmitted from the base station 1 for activating/deactivating retransmission are corresponding to DRB1 and DRB2, and first two bits of bitmap in the MAC CE transmitted from the base station 2 for activating/deactivating retransmission are corresponding to DRB2 and DRB3; for another example, as shown in FIG. 6, the base station 1 configures the MAC CE from the base station 1 for activating/deactivating retransmission, and first two bits of bitmap in the MAC CE are corresponding to DRB1 and DRB2; the base station 2 configures the MAC CE from the base station 2 for activating/deactivating retransmission, and first two bits of bitmap in the MAC CE are corresponding to DRB2 and DRB3;

receiving MAC CE transmitted from the base station for activating/deactivating retransmission, and activating/deactivating retransmission of corresponding RB according to indication of corresponding bit. For example, when the base station 1 transmits MAC CE for activating/deactivating retransmission, the UE activates/deactivates retransmission of DRB1 and DRB2 according to only indication of bits (first and second bits) corresponding to DRB1 and DRB2. When the base station 2 transmits MAC CE for activating/deactivating retransmission, the UE activates/deactivates retransmission of DRB2 and DRB3 according to only indication of bits (first and second bits) corresponding to DRB2 and DRB3.

Third manner, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station. Specifically, a base station where PDCP layer of the specific bearer is located is the master base station for the special bearer.

Specifically, different base stations use independent configurations for MAC CEs for activating/deactivating retransmission, that is, correspondence relationship between bits of the bitmap in the MAC CE and RBs may be varied according to RBs configured by various base stations. Meanwhile, for RB of dual-connectivity or multi-connectivity (i.e., RB which may be transmitted through one or more base stations and is allowed for retransmission), only one master base station can indicate activation/deactivation retransmission.

Configuring the preset field of MAC CE for activating/deactivating retransmission in the third manner has been described in details in the method applied to the base station, which will not be elaborated herein. Following the above example, steps performed by the UE include:

step 1: receiving and validating configuration of correspondence relationship between RBs and bits of bitmap in MAC CE transmitted from the base station for activating/deactivating retransmission; for example, as shown in FIG. 7, the base station 1 configures correspondence relationship between RB and bitmap in MAC CE for activating/deactivating retransmission, transmitted from either of the base station 1 and the second base station 2, first two bits of bitmap in the MAC CE transmitted from the base station 1 for activating/deactivating retransmission are corresponding to DRB1 and DRB2, and the first bit of bitmap in the MAC CE transmitted from the base station 2 for activating/deactivating retransmission is corresponding to DRB3; for another example, as shown in FIG. 7, the base station 1 configures the MAC CE transmitted from the base station 1 for activating/deactivating retransmission, first two bits of bitmap in the MAC CE are corresponding to DRB1 and DRB2; the base station 2 configures the MAC CE transmitted from the base station 2 for activating/deactivating retransmission, the first bit of bitmap in the MAC CE is corresponding to DRB3;

step 2: receiving MAC CE transmitted from the base station for activating/deactivating retransmission, and activating/deactivating retransmission of corresponding RB according to indication of corresponding bit. For example, when the base station 1 transmits MAC CE for activating/deactivating retransmission, the UE activates/deactivates retransmission of DRB1 and DRB2 according to only indication of bits (first and second bits) corresponding to DRB1 and DRB2. When the base station 2 transmits MAC CE for activating/deactivating retransmission, the UE activates/deactivates retransmission of DRB3 according to only indication of the bit (first bit) corresponding to DRB3.

In summary, in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. The UE activates/deactivates retransmission of corresponding RB, according to the base station which transmits the MAC CE for activating/deactivating retransmission as well as the correspondence relationship configured in advance. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

Figure 9:
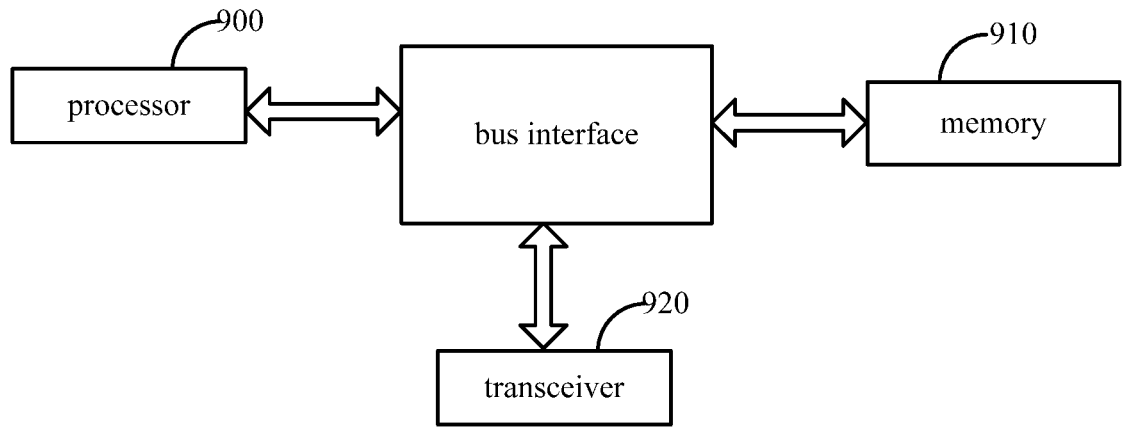
FIG. 9 is a schematic diagram of a base station according to an embodiment of the present disclosure.

As shown in FIG. 9, one embodiment of the present disclosure further provides a base station, including: a transceiver 920, a memory 910, a processor 900, and a computer program stored on the memory 910 and executable on the processor 900. The processor 900 is used to read the program in the memory 910 and perform the following procedures:

determining a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission;

when determining to activate/deactivate retransmission of the bearer which is allowed for retransmission under the first base station, populating, by the first base station, the bit, which is in the preset field of the MAC CE for activating/deactivating retransmission and corresponding to the bearer, thereby generating the MAC CE for activating/deactivating retransmission;

transmitting, by the transceiver 920, the generated MAC CE for activating/deactivating retransmission to the UE.

Optionally, the processor 900 is further used to perform the following procedures:

configuring the correspondence relationship between the bit in the preset field of the MAC CE of the first base station for activating/deactivating retransmission, and the bearer which is allowed for retransmission under the first base station; and transmitting, by the transceiver 920, the configured correspondence relationship to the UE.

Optionally, the processor 900 is further used to perform the following procedures:

configuring a correspondence relationship between a bit in a preset field of MAC CE from another base station in communication with the UE for activating/deactivating retransmission, and a bearer which is allowed for retransmission under the another base station; and transmitting, by the transceiver 920, the configured correspondence relationship to the UE; and/or, transmitting, by the transceiver 920, the configured correspondence relationship to the corresponding base station.

Optionally, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station. Specifically, a base station where PDCP layer of the specific bearer is located is the master base station for the special bearer.

In summary, in the base station provided in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. Further, the base station only indicates activation/deactivation retransmission of the bearer which is allowed for retransmission under the local base station itself. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

It should be noted that, the base station provided in the embodiment of the present disclosure is a base station capable of performing the above retransmission activating/deactivating method, and all embodiments of the above retransmission activating/deactivating method are applicable to the base station with same or similar being achieved.

One embodiment of the present disclosure further provides a computer readable storage medium including a computer program stored thereon. The computer program is executed by a processor to implement procedures of the above retransmission activating/deactivating method with same or similar being achieved, which will not be elaborated herein. The computer readable storage medium may be, such as a read-only memory (ROM), a random access memory (RAM), a magnetic disk, or an optical disk.

Figure 10:
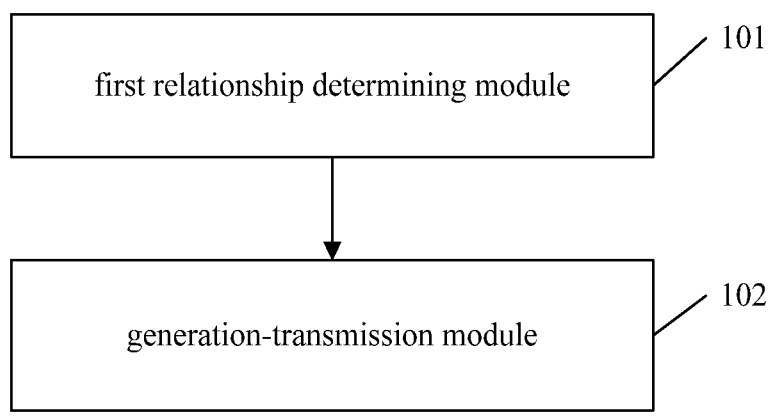
FIG. 10 is a first schematic diagram of a retransmission activating/deactivating device according to an embodiment of the present disclosure.

As shown in FIG. 10, one embodiment of the present disclosure further provides a retransmission activating/deactivating device which is applied to a first base station in communication with a user equipment (UE). The device includes:

a first relationship determining module 101 used to determine a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission;

a generation-transmission module 102 used to, when determining to activate/deactivate retransmission of the bearer which is allowed for retransmission under the first base station, populate, by the first base station, the bit, which is in the preset field of the MAC CE for activating/deactivating retransmission and corresponding to the bearer, thereby generating the MAC CE for activating/deactivating retransmission, and transmitting the generated MAC CE for activating/deactivating retransmission to the UE.

Optionally, the first relationship determining module 101 includes:

a first relationship determining submodule used to configure correspondence relationship between the bit in the preset field of the MAC CE of the first base station for activating/deactivating retransmission, and the bearer which is allowed for retransmission under the first base station; and a first transmission submodule used to transmit the configured correspondence relationship to the UE.

Optionally, the device further includes:

a first relationship configuration module used to configure a correspondence relationship between a bit in a preset field of MAC CE from another base station in communication with the UE for activating/deactivating retransmission, and a bearer which is allowed for retransmission under the another base station; and a first transmission module used to transmit the configured correspondence relationship to the UE; and/or, a second transmission module used to transmit the configured correspondence relationship to the corresponding base station.

Optionally, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station.

In summary, in the retransmission activating/deactivating device provided in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. Further, the base station only indicates activation/deactivation retransmission of the bearer which is allowed for retransmission under the local base station itself. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

It should be noted that, the retransmission activating/deactivating device provided in the embodiment of the present disclosure is a retransmission activating/deactivating device capable of performing the above retransmission activating/deactivating method, and all embodiments of the above retransmission activating/deactivating method are applicable to the retransmission activating/deactivating device with same or similar being achieved.

Figure 11:
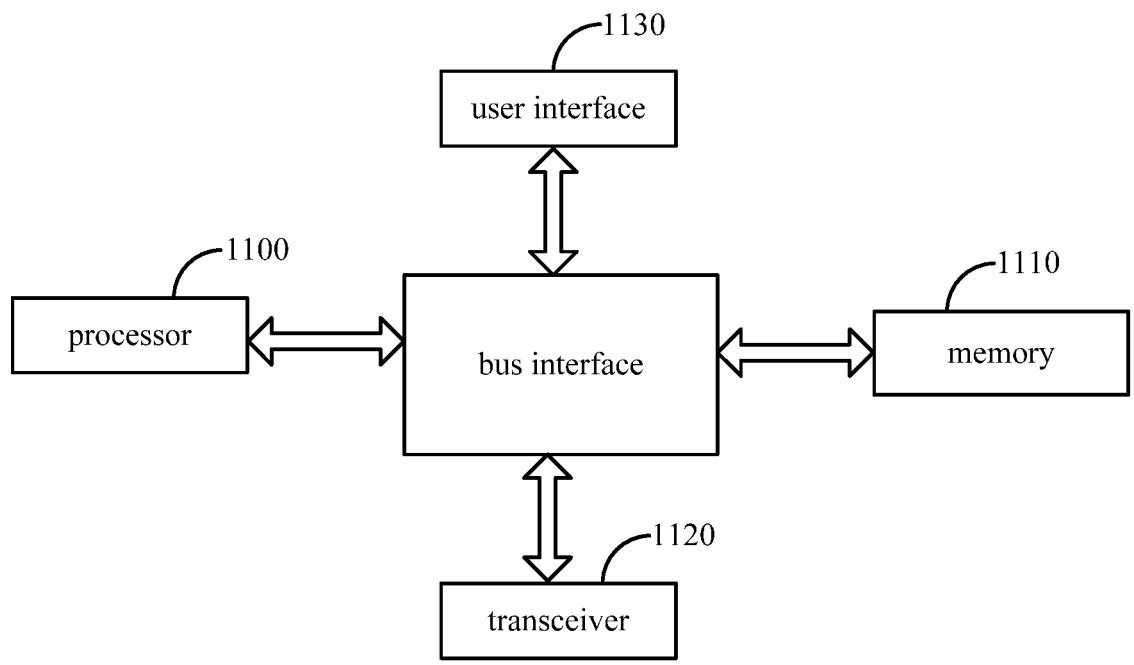
FIG. 11 is a schematic diagram of a user equipment according to an embodiment of the present disclosure.

As shown in FIG. 11, one embodiment of the present disclosure further provides a user equipment (UE), including: a transceiver 1120, a memory 1110, a processor 1100, and a computer program stored on the memory 1110 and executable on the processor 1100. The UE further includes a user interface 1130. The processor 1100 is used to read the program in the memory 1110 and perform the following procedures: determining a correspondence relationship between a bearer which is allowed for retransmission under the first base station and a bit of a preset field of media access control (MAC) control element (CE) of the first base station for activating/deactivating retransmission; where the preset field is used to indicate activation/deactivation retransmission of the bearer which is allowed for retransmission.

The transceiver 1120 is used to receive MAC CE for activating/deactivating retransmission transmitted from the first base station.

The processor 1100 is further used to perform the following procedures: according to the correspondence relationship, parsing the bit, which is in the preset field of MAC CE of the first base station for activating/deactivating retransmission and corresponding to the bearer which is allowed for retransmission under the first base station; and, according to indication of the bit, determining activation/deactivation retransmission of the corresponding bearer.

Optionally, the transceiver 1120 is further used to receive a correspondence relationship configured by the first base station between the bit in the preset field of the MAC CE of the first base station for activating/deactivating retransmission, and the bearer which is allowed for retransmission under the first base station.

Optionally, the transceiver 1120 is further used to receive a correspondence relationship configured by the first base station between a bit in a preset field of MAC CE from another base station in communication with the UE for activating/deactivating retransmission, and a bearer which is allowed for retransmission under the another base station.

Optionally, the transceiver 1120 is further used to receive MAC CE for activating/deactivating retransmission transmitted from another base station.

The processor 1100 is further used to perform the following procedures:

according to the correspondence relationship, parsing the bit, which is in the preset field of MAC CE of the another base station for activating/deactivating retransmission and corresponding to the bearer which is allowed for retransmission under the another base station;

according to indication of the bit, determining activation/deactivation retransmission of the corresponding bearer.

Optionally, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station.

In summary, in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. The UE activates/deactivates retransmission of corresponding bear, according to the base station which transmits the MAC CE for activating/deactivating retransmission as well as the correspondence relationship configured in advance. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

It should be noted that, the UE provided in the embodiment of the present disclosure is a UE capable of performing the above retransmission activating/deactivating method, and all embodiments of the above retransmission activating/deactivating method are applicable to the UE with same or similar being achieved.

One embodiment of the present disclosure further provides a computer readable storage medium including a computer program stored thereon. The computer program is executed by a processor to implement procedures of the above retransmission activating/deactivating method with same or similar being achieved, which will not be elaborated herein. The computer readable storage medium may be, such as a read-only memory (ROM), a random access memory (RAM), a magnetic disk, or an optical disk.

Figure 12:
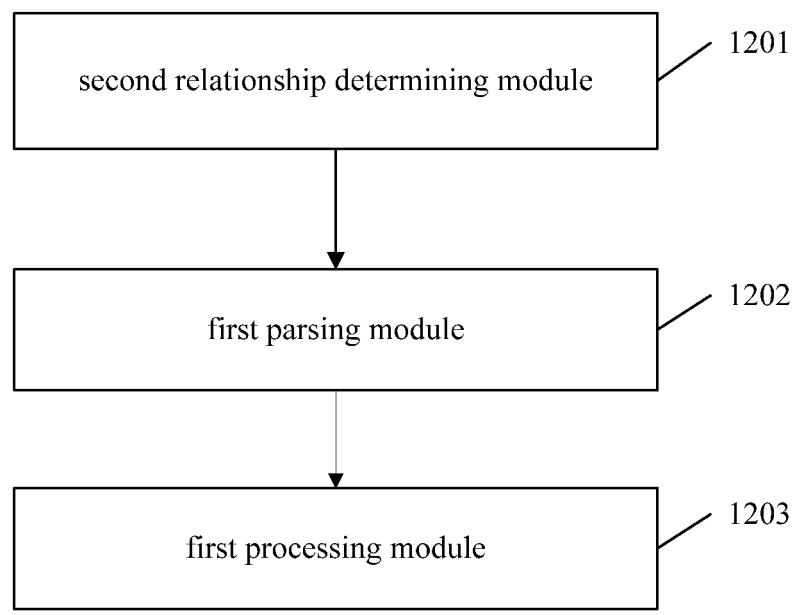
FIG. 12 is a second schematic diagram of a retransmission activating/deactivating device according to an embodiment of the present disclosure.

As shown in FIG. 12, one embodiment of the present disclosure further provides a retransmission activating/deactivating device which is applied to a user equipment (UE) in communication with multiple base stations. The device includes:

a second relationship determining module 1201 used to determine a correspondence relationship between a bearer which is allowed for retransmission under a first base station and a bit of a preset field of media access control (MAC) control element (CE) of the first base station for activating/deactivating retransmission; where the preset field is used to indicate activation/deactivation retransmission of the bearer which is allowed for retransmission;

a first parsing module 1202 used to, when receiving MAC CE for activating/deactivating retransmission transmitted from the first base station, according to the correspondence relationship, parse the bit, which is in the preset field of MAC CE of the first base station for activating/deactivating retransmission and corresponding to the bearer which is allowed for retransmission under the first base station;

a first processing module 1203 used to determine activation/deactivation retransmission of the corresponding bearer according to indication of the bit.

Optionally, the second relationship determining module includes:

a second relationship determining submodule used to receive a correspondence relationship configured by the first base station between the bit in the preset field of the MAC CE of the first base station for activating/deactivating retransmission, and the bearer which is allowed for retransmission under the first base station.

Optionally, the device further includes:

a configuration receiving module used to receive a correspondence relationship configured by the first base station between a bit in a preset field of MAC CE from another base station in communication with the UE for activating/deactivating retransmission, and a bearer which is allowed for retransmission under the another base station.

Optionally, the device further includes:

a second parsing module used to, when receiving MAC CE for activating/deactivating retransmission transmitted from another base station, according to the correspondence relationship, parse the bit, which is in the preset field of MAC CE of the another base station for activating/deactivating retransmission and corresponding to the bearer which is allowed for retransmission under the another base station;

a second processing module used to determine activation/deactivation retransmission of the corresponding bearer according to indication of the bit.

Optionally, the preset field of MAC CE from the first base station for activating/deactivating retransmission has the same structure as the preset field of MAC CE from another base station in communication with the UE for activating/deactivating retransmission;

bits in each of the preset fields having the same structure of MAC CEs for activating/deactivating retransmission, have correspondence relationship with all bearers which are allowed for retransmission under the UE.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission under the first base station;

bits in the preset field of MAC CE from another base station for activating/deactivating retransmission, have correspondence relationship with bearers which are allowed for retransmission under the another base station.

Optionally, the preset field of MAC CE from the first base station for activating/deactivating retransmission, and the preset field of MAC CE from another base station in communication with the UE for activating/deactivating retransmission, have mutually independent structures;

bits in the preset field of MAC CE from the first base station for activating/deactivating retransmission, have correspondence relationship with bearers which are allowed for retransmission only under the first base station;

bits in the preset field of MAC CE from the first base station for activating/deactivating retransmission, have correspondence relationship with special bearers which are allowed for retransmission under the first base station; where the special bearers are retransmitted in a dual-connectivity manner or multi-connectivity mode, and a master base station for the special bearers is the first base station.

In summary, in the above embodiment of the present disclosure, the base station configures in advance the correspondence relationship between the bearers allowed for retransmission and bits of the preset field of MAC CE for activating/deactivating retransmission, and transmits the configured correspondence relationship to the UE. The UE activates/deactivates retransmission of corresponding bear, according to the base station which transmits the MAC CE for activating/deactivating retransmission as well as the correspondence relationship configured in advance. In this way, when the UE is in communication with multiple base stations, the UE can correctly receive and activate/deactivate retransmission of bearers of different types, thereby effectively implementing retransmission and avoiding problem of erroneous operation caused by misunderstanding at the base station and the UE.

It should be noted that, the retransmission activating/deactivating device provided in the embodiment of the present disclosure is a retransmission activating/deactivating device capable of performing the above retransmission activating/deactivating method, and all embodiments of the above retransmission activating/deactivating method are applicable to the retransmission activating/deactivating device with same or similar being achieved.

Those skilled in the art should understand that the embodiments of the present disclosure may be provided as a method, a system or a computer program product. Thus, this application may take the form of an entirely hardware embodiment, an entirely software embodiment, or an embodiment combining software and hardware aspects. Moreover, the present application may take the form of a computer program product implemented on one or more computer-readable storage media (including but not limited to magnetic disk storage, optical storage, etc.) containing computer-usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. A duplication activating/deactivating method, applied to a first base station in communication with a user equipment (UE), comprising:
   determining a correspondence relationship between a bearer which is allowed for duplication under the first base station and a bit of a preset field of media access control (MAC) control element (CE) of the first base station for activating/deactivating duplication; wherein the preset field is used to indicate activation/deactivation duplication of the bearer which is allowed for duplication; and
   when determining to activate/deactivate duplication of the bearer which is allowed for duplication under the first base station, populating, by the first base station, the bit, which is in the preset field of the MAC CE for activating/deactivating duplication and corresponding to the bearer, thereby generating the MAC CE for activating/deactivating duplication, and transmitting to the UE the generated MAC CE for activating/deactivating duplication;
   wherein the method further includes:
   (i) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication under the first base station; bits in the preset field of the MAC CE from another base station for activating/deactivating duplication, have correspondence relationship with bearers which are allowed for duplication under the another base station; or,
   (ii) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication only under the first base station; and bits in the preset field of the MAC CE from the first base station for activating/deactivating duplication, have correspondence relationship with special bearers which are allowed for duplication under the first base station; wherein the special bearers are retransmitted in a dual-connectivity manner or multi-connectivity mode, and a master base station for the special bearers is the first base station.

2. The method according to claim 1, wherein the step of determining the correspondence relationship between the bearer which is allowed for duplication under the first base station and the bit of a preset field of media access control (MAC) control element (CE) of the first base station for activating/deactivating duplication; wherein the preset field is used to indicate activation/deactivation duplication of the bearer which is allowed for duplication, comprises:
   configuring, by the first base station, the correspondence relationship between the bit in the preset field of the MAC CE of the first base station for activating/deactivating duplication, and the bearer which is allowed for duplication under the first base station; and
   transmitting, by the first base station, the configured correspondence relationship to the UE.

3. The method according to claim 1, wherein the method further comprises:
   configuring, by the first base station, another correspondence relationship between another bit in a preset field of MAC CE from another base station in communication with the UE for activating/deactivating duplication, and a bearer which is allowed for duplication under the another base station; and
   transmitting, by the first base station, the configured correspondence relationship to the UE; and/or, transmitting, by the first base station, the configured correspondence relationship to the corresponding base station.

4. A duplication activating/deactivating method, applied to a user equipment (UE) in communication with multiple base stations, comprising:
   determining a correspondence relationship between a bearer which is allowed for duplication under a first base station and a bit of a preset field of media access control (MAC) control element (CE) of the first base station for activating/deactivating duplication; wherein the preset field is used to indicate activation/deactivation duplication of the bearer which is allowed for duplication; and
   when receiving the MAC CE for activating/deactivating duplication transmitted from the first base station, according to the correspondence relationship, parsing the bit, which is in the preset field of the MAC CE of the first base station for activating/deactivating duplication and corresponding to the bearer which is allowed for duplication under the first base station;
   according to indication of the bit, determining activation/deactivation duplication of the corresponding bearer;
   wherein the method further includes:
   (i) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication under the first base station; bits in the preset field of the MAC CE from another base station for activating/deactivating duplication, have correspondence relationship with bearers which are allowed for duplication under the another base station; or, (ii) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication only under the first base station; and bits in the preset field of the MAC CE from the first base station for activating/deactivating duplication, have correspondence relationship with special bearers which are allowed for duplication under the first base station; wherein the special bearers are retransmitted in a dual-connectivity manner or multi-connectivity mode, and a master base station for the special bearers is the first base station.

5. The method according to claim 4, wherein the step of determining the correspondence relationship between the bearer which is allowed for duplication under the first base station and the bit of the preset field of media access control (MAC) control element (CE) of the first base station for activating/deactivating duplication, comprises:

receiving the correspondence relationship configured by the first base station between the bit in the preset field of the MAC CE of the first base station for activating/deactivating duplication, and the bearer which is allowed for duplication under the first base station.

6. The method according to claim 4, wherein the method further comprises:

receiving a correspondence relationship configured by the first base station between a bit in a preset field of MAC CE from another base station in communication with the UE for activating/deactivating duplication, and a bearer which is allowed for duplication under the another base station.

7. The method according to claim 6, wherein the method further comprises:

when receiving the MAC CE for activating/deactivating duplication transmitted from another base station, according to the correspondence relationship, parsing the bit, which is in the preset field of the MAC CE of the another base station for activating/deactivating duplication and corresponding to the bearer which is allowed for duplication under the another base station;

according to indication of the bit, determining activation/deactivation duplication of the corresponding bearer.

8. A user equipment (UE), comprising: a transceiver, a memory, a processor, and a computer program stored on the memory and executable on the processor; wherein the processor is used to read the program in the memory and perform the following procedures: determining a correspondence relationship between a bearer which is allowed for duplication under a first base station and a bit of a preset field of media access control (MAC) control element (CE) of the first base station for activating/deactivating duplication;

wherein the preset field is used to indicate activation/deactivation duplication of the bearer which is allowed for duplication;

the transceiver is used to receive the MAC CE for activating/deactivating duplication transmitted from the first base station;

wherein the processor is further used to perform the following procedures:

according to the correspondence relationship, parsing the bit, which is in the preset field of MAC CE of the first base station for activating/deactivating duplication and corresponding to the bearer which is allowed for duplication under the first base station; and, according to indication of the bit, determining activation/deactivation duplication of the corresponding bearer;

wherein the user equipment further includes:

(i) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication under the first base station; bits in the preset field of the MAC CE from another base station for activating/deactivating duplication, have correspondence relationship with bearers which are allowed for duplication under the another base station; or, (ii) the preset field of the MAC CE from the first base station for activating/deactivating duplication, and a preset field of MAC CE from another base station in communication with the UE for activating/deactivating duplication, have mutually independent structures; bits in the preset field of the MAC CE from the first base station for activating/deactivating duplication, have correspondence relationship with bearers which are allowed for duplication only under the first base station; and bits in the preset field of the MAC CE from the first base station for activating/deactivating duplication, have correspondence relationship with special bearers which are allowed for duplication under the first base station; wherein the special bearers are retransmitted in a dual-connectivity manner or multi-connectivity mode, and a master base station for the special bearers is the first base station.

9. The user equipment according to claim 8, wherein the transceiver is further used to receive the correspondence relationship configured by the first base station between the bit in the preset field of the MAC CE of the first base station for activating/deactivating duplication, and the bearer which is allowed for duplication under the first base station; or, wherein the transceiver is further used to receive a correspondence relationship configured by the first base station between another bit in another preset field of MAC CE from another base station in communication with the UE for activating/deactivating duplication, and a bearer which is allowed for duplication under the another base station.

10. The user equipment according to claim 9, wherein the transceiver is further used to receive the MAC CE for activating/deactivating duplication transmitted from another base station;

wherein the processor is further used to perform the following procedures:

according to the correspondence relationship, parsing the bit, which is in the preset field of the MAC CE of the another base station for activating/deactivating duplication and corresponding to the bearer which is allowed for duplication under the another base station;

according to indication of the bit, determining activation/deactivation duplication of the corresponding bearer.

\* \* \* \* \*